United States Patent
Köpfer

(10) Patent No.: US 12,085,064 B2
(45) Date of Patent: Sep. 10, 2024

(54) ACTUATOR SUBASSEMBLY CONTROLLED BY SHAPE MEMORY ALLOY WIRES, SYSTEM COMPRISING A PLURALITY OF SUCH SUBASSEMBLIES AND CONTROL METHOD FOR SUCH SYSTEM

(71) Applicant: ACTUATOR SOLUTIONS GMBH, Gunzenhausen (DE)

(72) Inventor: Markus Köpfer, Stoedtlen-Regelsweiler (DE)

(73) Assignee: ACTUATOR SOLUTIONS GMBH, Gunzenhausen (DE)

(*) Notice: Subject to any disclaimer, the term of this patent is extended or adjusted under 35 U.S.C. 154(b) by 0 days.

(21) Appl. No.: 18/681,898

(22) PCT Filed: Aug. 12, 2022

(86) PCT No.: PCT/EP2022/072691
§ 371 (c)(1),
(2) Date: Feb. 7, 2024

(87) PCT Pub. No.: WO2023/017158
PCT Pub. Date: Feb. 16, 2023

(65) Prior Publication Data
US 2024/0263622 A1    Aug. 8, 2024

(30) Foreign Application Priority Data
Aug. 13, 2021  (IT) ................ 102021000021887

(51) Int. Cl.
F03G 7/06    (2006.01)
(52) U.S. Cl.
CPC .............. F03G 7/06143 (2021.08)

(58) Field of Classification Search
CPC ........................................... F03G 7/06
USPC .................................. 60/526–528
See application file for complete search history.

(56) References Cited

U.S. PATENT DOCUMENTS

| | | | | |
|---|---|---|---|---|
| 4,544,988 A * | 10/1985 | Hochstein | ........... | H01H 61/0107 337/140 |
| 6,239,686 B1 * | 5/2001 | Eder | ..................... | H01H 37/323 337/140 |
| 2012/0104292 A1 | 5/2012 | Kollar et al. | | |
| 2012/0151913 A1 * | 6/2012 | Foshansky | ............. | F16K 31/003 60/527 |
| 2014/0035716 A1 * | 2/2014 | Doblack | ................ | H01H 85/36 337/148 |
| 2014/0339265 A1 * | 11/2014 | Marone | ................... | F03G 7/065 337/140 |
| 2015/0048921 A1 * | 2/2015 | Alacqua | ............. | H01H 61/0107 337/140 |

OTHER PUBLICATIONS

International Search Report and Written Opinion issued Nov. 22, 2022 in PCT/EP2022/072691, 12 pages.

* cited by examiner

Primary Examiner — Shafiq Mian
(74) Attorney, Agent, or Firm — Element IP, PLC

(57) ABSTRACT

The present invention is inherent to an actuator subassembly (100) controlled by shape memory alloy wires (130, 130'), to a system comprising a plurality of such subassemblies and to a control method for such system, wherein the shape memory alloy wires (130, 130') are in the so-called antagonistic configuration.

14 Claims, 7 Drawing Sheets

ACTUATOR SUBASSEMBLY CONTROLLED BY SHAPE MEMORY ALLOY WIRES, SYSTEM COMPRISING A PLURALITY OF SUCH SUBASSEMBLIES AND CONTROL METHOD FOR SUCH SYSTEM

The present invention is inherent to an actuator subassembly controlled by shape memory alloy (SMA) wires, a system comprising a plurality of such subassemblies and to a method of controlling such system.

Generally speaking, the use of SMA wires as actuating elements provides various advantages with respect to other actuating systems in terms of weight, power consumption and costs via the capability of properly trained SMA wires to shorten when heated, most typically by Joule effect through a suitable current supply.

The above advantages of SMA wires and more in general of the SMA technology have been exploited in a variety of technical fields, for example in camera module actuators, as described in U.S. Ser. No. 10/514,593, or bi-directional discrete actuators, as described in EP 3877650, or bistable inertial actuators, as described in the international patent applications WO 2021/197980 and PCT/EP2022/054601, or fluidic valves and fluidic valves subassemblies, as described in the international patent application PCT/EP2022/061170 (all of the above being in the applicant's name), or for multi-segmented spine with integrated actuation as described in US 20100295417, or foldable structures, as described in U.S. Pat. No. 9,205,593.

Generally speaking, SMA-based actuators require a return means opposing the action of the SMA-actuated component to ensure a bi-directional movement of a displaceable item. The return means can be a passive elastic element, such as a linear or coiled spring like in various embodiments of a plug actuator described in US 2012/104292, or another active element, such as a SMA component acting in opposition with respect to the first one, in the so-called antagonistic configuration. Some examples of SMA-based antagonistic components in actuators are given in the aforementioned U.S. Ser. No. 10/514,593 and EP 3877650, in EP 3908753, in U.S. Pat. No. 4,544,988 and in US 2012/151913.

Another feature that it is often appreciated in SMA-based actuators is the possibility of a bistable mechanical control, such as described in the aforementioned international patent applications WO 2021/197980 and PCT/EP2022/054601.

The purpose of the present invention is to overcome the limit of the known art with a SMA actuator that is based on SMA wires in antagonistic configuration as well as bistable, and in a first aspect thereof consists in an actuator subassembly comprising a quadrangular frame with four corner connectors, a movable element placed in correspondence of the center of said frame and connected to it by elastically deformable arms, a first shape memory alloy wire fixed onto two opposing corner connectors and contacting a first surface of said movable element, a second shape memory alloy wire fixed onto the other two opposing corner connectors and contacting a second surface of said movable element, said second surface being opposed to said first surface.

In the most common embodiment, the first surface is the upper surface of the movable element and the second surface is the lower surface of the movable element.

It is important to underline that the expression "in correspondence of the center of said frame" has to be interpreted in the context of a real device with its manufacturing tolerances. Therefore, although an ideal alignment between the frame center and the movable element center is desirable, the system may work even if the movable element symmetry axis (if present) is not located in the intersection between the planes containing the first shape memory alloy wire and the second shape memory alloy wire but rather the movable element as a whole intercepts such plane intersection.

The invention will be further illustrated with the help of the following figures where:

Figure 3A:
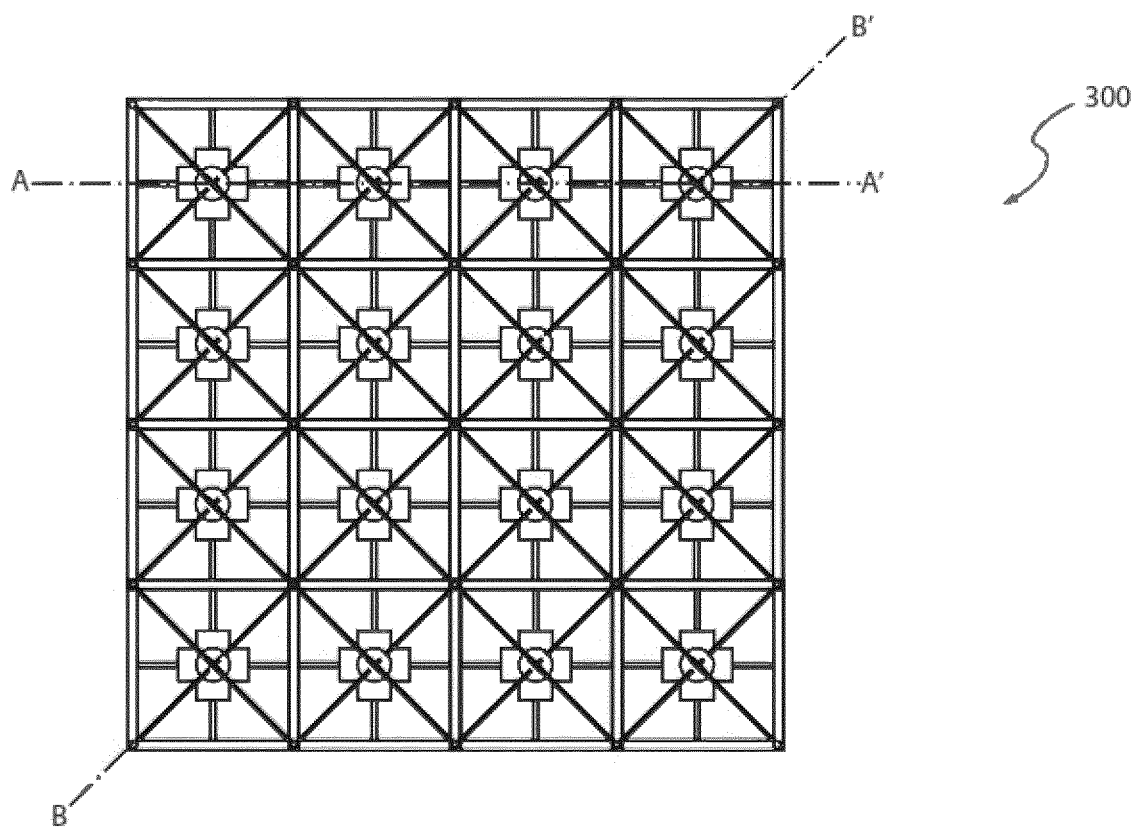
FIG. 3A is a schematic representation of a view from above of a system comprising a plurality of actuator subassemblies according to a second embodiment.
Figure 3B:
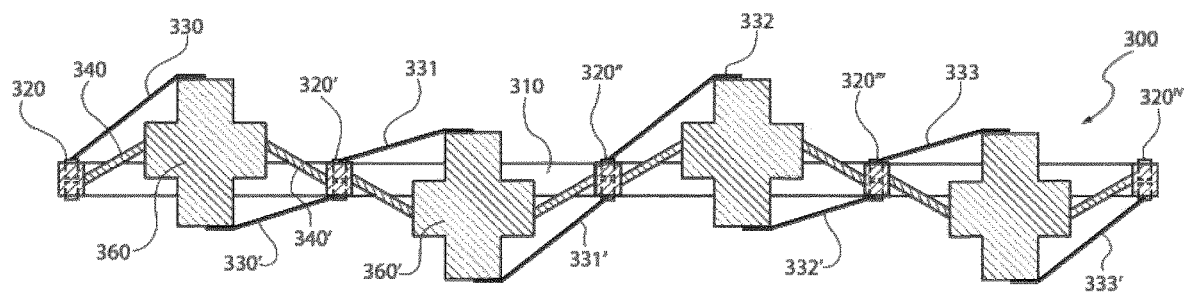
Figure 3C:
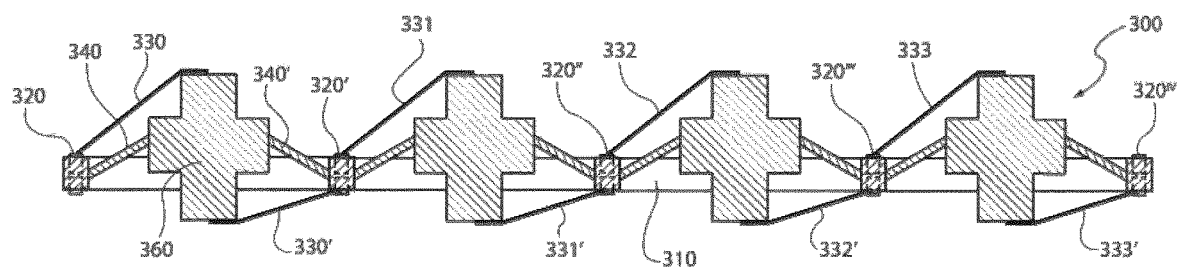
Figure 3D:
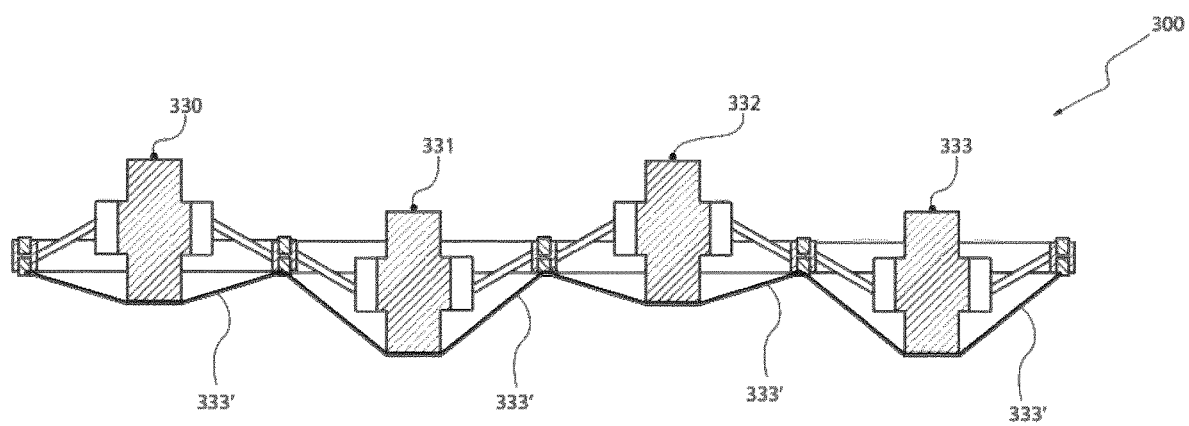
Figure 4A:
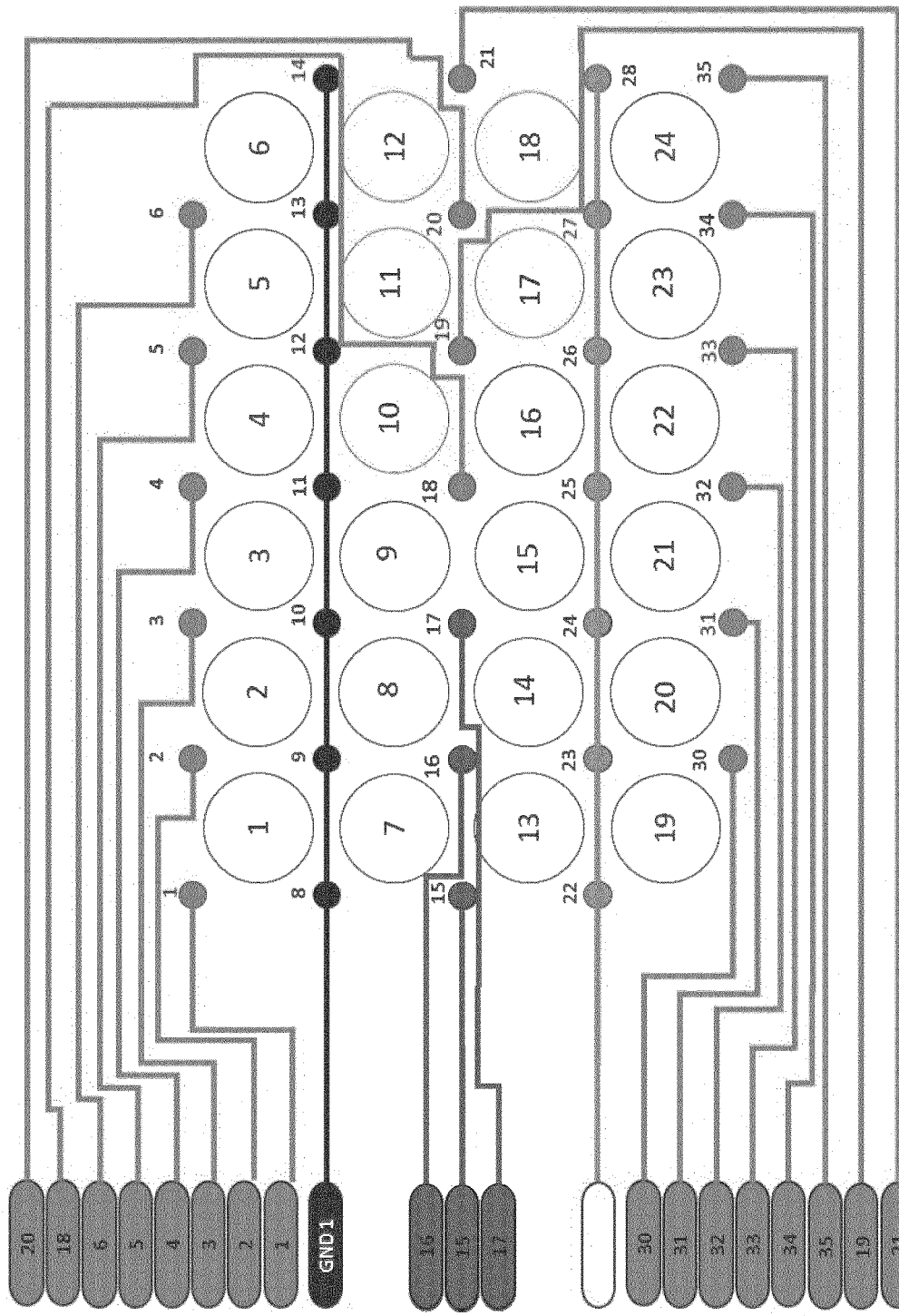
Figure 4B:
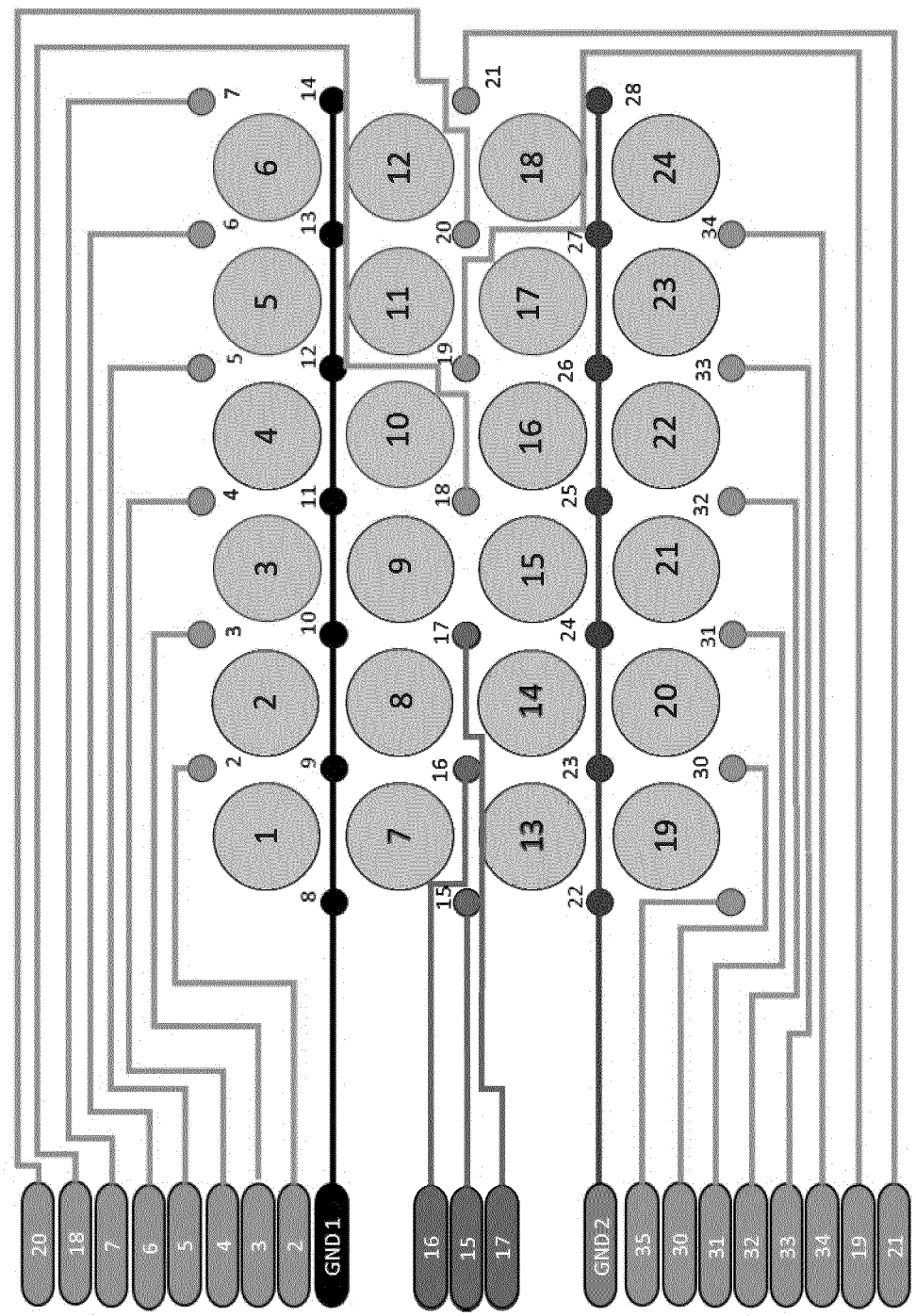

FIGS. 3B and 3C are schematic cross-sectional views along line A-A' of the system of FIG. 3A with the actuator subassemblies in different equilibrium/stable conditions, FIG. 3D is a schematic cross-sectional view along line B-B' of the system of FIG. 3A; and FIGS. 4A and 4B are electronic schematics suitable to control the upper and lower SMA wires, respectively, of a system comprising twenty-four actuator subassemblies according to the present invention.

It is to be remarked that the size and the dimensional ratios of the various elements shown in the figures in some cases have been altered in order to help understanding the drawings, with particular but not exclusive reference to the SMA wires diameters and to the thicknesses of the elastically deformable arms. Moreover, means to supply current/voltage to the SMA wires are not shown since they are widely known to a person skilled in the art and not necessary for the understanding of the invention.

Figure 1A:
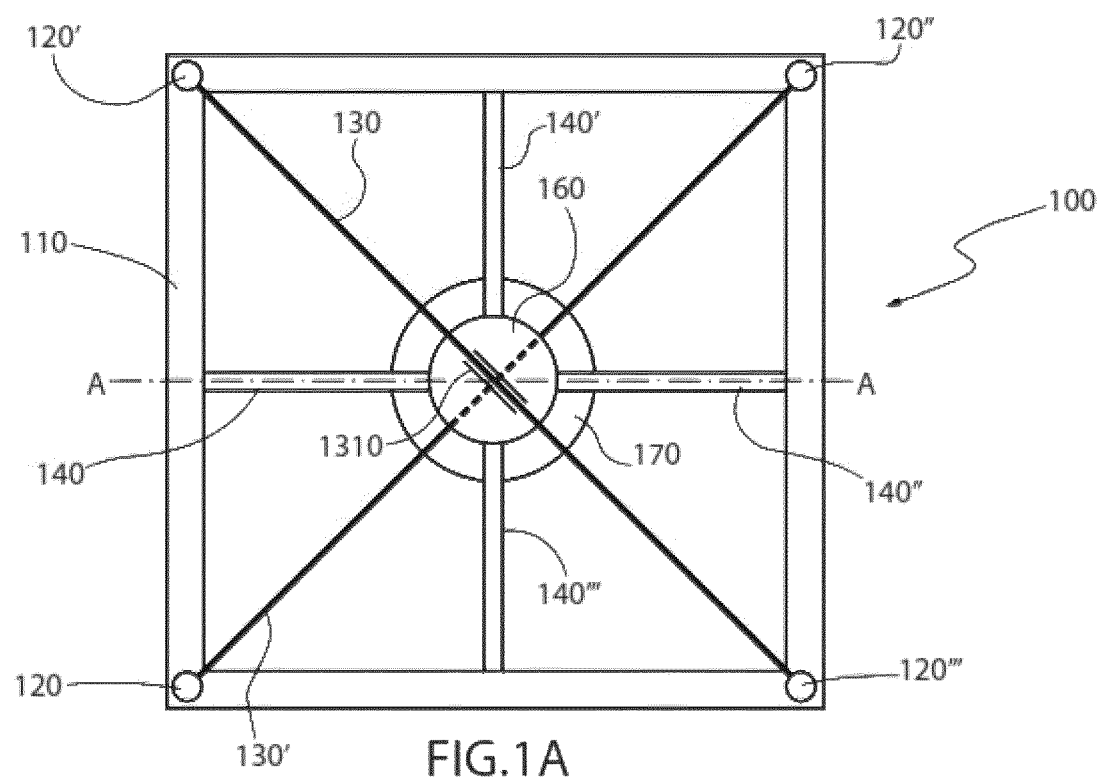
FIG. 1A is a schematic representation of a view from above of an actuator subassembly according to a first embodiment of the present invention.
Figure 1B:
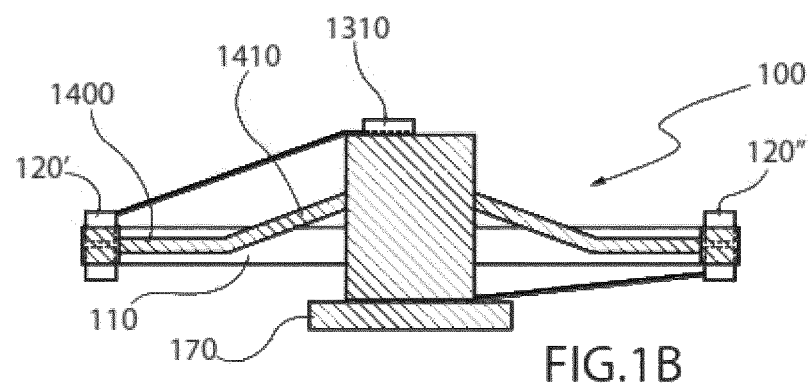
FIGS. 1B and 1C are schematic cross-sectional views along line A-A of the actuator subassembly of FIG. 1A in its two stable positions.
Figure 1C:
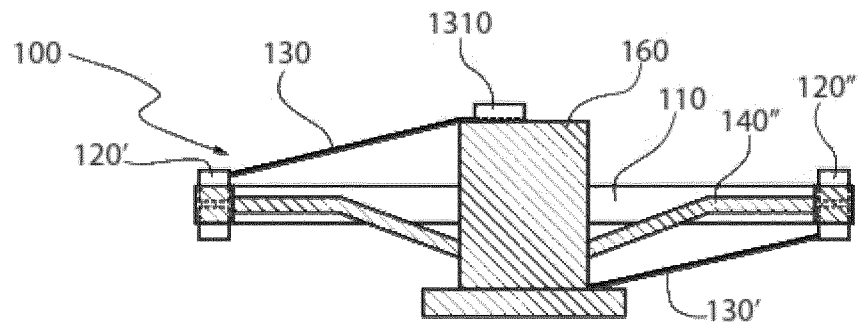

A schematic view from above of an actuator subassembly according to a first embodiment of the present invention is shown in FIG. 1A, whereas two cross-sectional views thereof are shown in FIGS. 1B and 1C. The actuator subassembly 100 comprises a quadrangular frame 110, in particular square-shaped, having four fixing elements 120, 120', 120", 120''' in correspondence of its corners, with opposite elements 120', 120''' along a first diagonal being used to fix a first shape memory alloy wire 130, whereas the opposite elements 120 and 120" along the other diagonal are used to fix a second shape memory alloy wire 130'.

The shape memory alloy wires 130, 130' are in the so-called antagonistic configuration, meaning that they exert a force in opposite directions onto a certain component, which in the present case is a movable element 160 over which passes wire 130 whereas wire 130' passes under it. The upper surface of the movable element 160 has a guide 1310 for keeping the first SMA wire 130 in place, while the second SMA wire 130' is retained in a guide (not shown) formed on the lower surface of the movable element 160 where a plunger 170 is connected, with the second SMA wire 130' passing between them.

The first SMA wire 130 lies above frame 110, whereas the second SMA wire 130' lies below frame 110, and they are lying into different planes, that are orthogonal to each other when the frame 110 has the preferred square shape illustrated in the figures, differently from the configurations shown in the above-mentioned U.S. Ser. No. 10/514,593, EP 3877650, EP 3908753, US 2012/151913 and U.S. Pat. No. 4,544,988.

In particular, US 2012/151913 shows two couples of SMA wires in antagonistic configuration, each SMA wire being connected to two adjacent corners of a parallelepipedal frame, differently from the present invention where the two SMA wires are each connected to opposing corners of a quadrangular frame. U.S. Pat. No. 4,544,988 has a frameless structure with SMA antagonistic wires in a similar connection to adjacent corners as in US 2012/151913. Also the above-mentioned US 2012/0104292 has one embodiment with two SMA wires in antagonistic configuration lying essentially in the same plane, i.e. their two extremities are connected to the same opposing walls of an assembly cover.

The use of SMA wires in antagonistic configuration and at the same time lying in planes orthogonal or almost orthogonal to each other prevents the movable structure from tilting while switching between the two stable positions of the actuator. The SMA wire plane is defined as the plane containing the SMA wire and its corner connectors, and such substantial orthogonality condition between the SMA wire planes is achieved by means of the SMA wires being connected to opposite corners of a quadrangular frame, so that their planes intersect at an angle of 90°±20°. Such a condition is not achievable by the adjacent SMA wires connections of the aforementioned US 2012/151913 and U.S. Pat. No. 4,544,988, nor in US 2012/104292 by the SMA wires in antagonistic configuration lying essentially in the same plane.

This aspect is of particular relevance when the movable element material is not hard and may deform upon multiple actuations of the SMA wires. Moreover, the substantially orthogonal arrangement simplifies the operation to heat both wires to adjust the flow and the switching timing. Having both wires under stress along the same direction may generate a tilting moment when the attachment points are not perfectly aligned, and this happens when the planes of the SMA wires are essentially parallel but not perfectly parallel, as in real world devices. The above-mentioned configuration of US 2012/104292 with antagonistic wires is particularly prone to manifesting this problem.

On the other hand, the movable structure in US 2012/151913 is prevented from tilting or twisting by having it snugly fit into a channel formed in the inner surface of its parallelepipedal frame, with the risk of hindering the smooth passage between the two stable positions. A similar arrangement is disclosed also in U.S. Pat. No. 4,544,988, providing a guide rail for guiding the movement of the movable structure between the two stable positions, said movable structure being not even connected to its frame by elastically deformable arms but only by the SMA wires themselves.

The present invention is not limited to any specific shape or geometrical configuration for movable element 160 as long as it has two opposite surfaces available for firm contact with the antagonistic SMA wires 130, 130', as shown in FIGS. 1A-1C.

A plunger 170 is connected with the movable element 160 to render the actuator subassembly apt to be used in fluidic devices or analytical equipment, such as test microplates, comprising a high number of test cells or test wells (the possible numerical range is quite wide and usually comprised between 6 and 1536). Such devices are widely known and diffused, see for example the paper "Fully integrated rapid microfluidic device translated from conventional 96-well ELISA kit" by M. Jalal Uddin et al, Scientific Reports volume 11, Article number: 1986 (2021).

The actuator subassembly 100 of FIGS. 1A-1C achieves bistable operation through four elastically deformable arms 140, 140', 140", 140'" connecting the movable element 160 to the square frame 110 at middle positions of the frame sides, each of said elastically deformable arms 140, 140', 140", 140'" having two stable positions, an upper one and a lower one, as shown in FIGS. 1B (upper) and 1C (lower). It is to be remarked that the alternate actuation of the SMA wires 130, 130' merely needs to be sufficient to bring the elastically deformable arms 140, 140', 140", 140'" beyond the snap-on equilibrium position, i.e. the total travel of the movable element 160 is a combination of the effects of the SMA wire push and the snapping of the deformable arms. As shown in FIGS. 1B-1C the flexible arms may have a first straight and rigid portion 1400 connected to frame 110 and a second elastically deformable portion 1410 connected to the movable element 160.

Preferably, the two SMA wires 130, 130' have a maximum distance between each other comprised between 2.5 and 15 mm, corresponding in the configuration shown in FIGS. 1A-1C to the height of the movable element 160, since SMA wires 130 and 130' are in contact with its upper and lower surfaces respectively. Preferably, the distance between the frame corner connectors along the frame diagonal is comprised between 25 and 100 mm.

The position of the movable element 160 depends from the last actuated SMA wire, namely the lower SMA wire 130' for the plunger 170 in the raised configuration (FIG. 1B) and the upper SMA wire 130 for the plunger 170 in the lowered configuration (FIG. 1C). It is to be remarked that the force exerted by the elastic deformable arms 140, 140', 140", 140'" keeps the actuator subassembly in its stable positions with no need for the actuation of the SMA wires 130, 130', so power is provided to the appropriate SMA wire only for switching the actuator subassembly from one stable position to the other.

Even though the actuator subassembly according to present invention can be used as the active part of a stand-alone actuator, its advantages are fully exploited in a so-called matrix configuration, i.e. a configuration wherein a plurality of actuator subassemblies are connected together in rows and columns. In this case, a single SMA wire can operate on multiple diagonally aligned actuator subassemblies, and adjacent subassemblies share one or two common frame corner connectors.

Figure 2A:
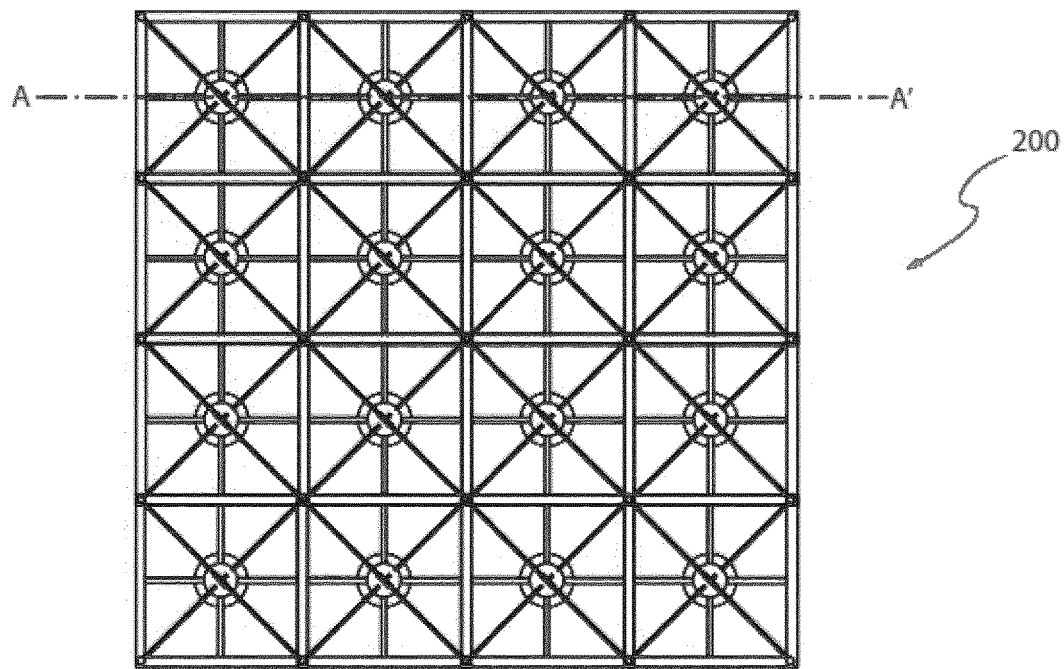
FIG. 2A is a schematic representation of a view from above of a system comprising a plurality of actuator subassemblies according to FIG. 1A.
Figure 2B:
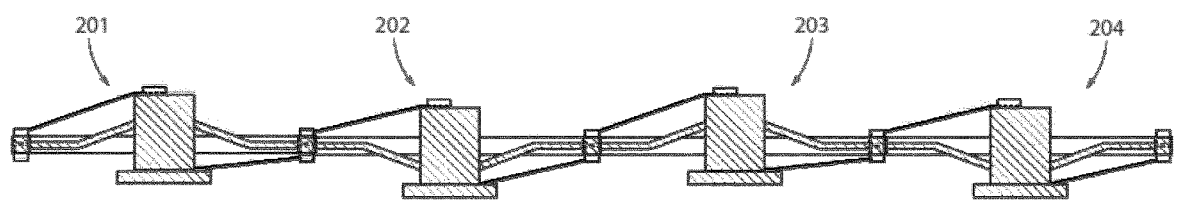
FIG. 2B is a schematic cross-sectional view along line A-A' of the system of FIG. 2A.

FIG. 2A shows a schematic representation of a view from above of such a system 200 composed by sixteen actuator subassemblies according to FIG. 1A, four on each row and four on each column. The cross-sectional view of a given row, e.g. along line A-A', shown in FIG. 2B illustrates how the four subassemblies 201, 202, 203, 204 making up the row can be in a different state, i.e. plunger 170 is raised in actuator subassemblies 201, 203, 204 and instead lowered in actuator subassembly 202.

A variant of the above-described actuator subassembly system of FIG. 2A is shown in FIGS. 3A-3D illustrating a system 300 comprising actuator subassemblies in which the movable element 360 has a cross-shaped vertical cross-section and the elastically deformable arms 340, 340' are deformable straight elements connecting the movable elements 360 with frame 310 that has integrated corner connectors 320, 320', 320", 320'" and 320$^{iv}$.

As shown by the comparison of FIGS. 3B and 3C, representing cross-sectional views along line A-A' of FIG. 3A, it is possible to drive a specific actuator subassembly by setting a voltage difference between the opposing frame corner connectors. In the case exemplified in FIG. 3B, the second and fourth subassemblies have movable element 360 that has been lowered through the actuation of SMA wires 331 and 333 respectively, and is kept in that position by the action of the deformable arms. To bring it back to the upper position, SMA wires 331' and 333' are activated by passing a current therethrough via connectors 320'/320" and 320'''/320$^{iv}$ respectively, so that the movable element 360 is pushed upwards as shown in FIG. 3C.

It is to be underlined that in these cross-sectional views SMA elements 330, 331, 332, 333, 330', 331', 332', 333' are all different wires, as in the system of FIG. 2A, but a single SMA wire may control a plurality of actuator subassemblies disposed along a system diagonal, as shown in FIG. 3D that is a schematic cross-sectional view taken along line B-B' of FIG. 3A. In this case, the lower SMA elements are all portions of a single shape memory alloy wire 333', whereas the upper ones 330, 331, 332, 333 are all different SMA wires. In this embodiment, at least one SMA wire connects a plurality of actuator subassemblies, whose number is preferably comprised between 6 and 96.

With regard to the way to operate a system according to present invention, it is important to be able to control independently the voltage applied to any of the frame corner connectors so that by suitable voltage difference between opposed frame corner connectors the shape memory alloy element, being it a SMA wire or a SMA wire portion in case of a SMA wire connecting more actuator subassemblies, is actuated (shortened) changing the actuator subassembly to the other stable position. Needless to say, its antagonistic SMA element is not supplied with any current, until the need arises to switch back the actuator subassembly to its previous stable position.

Using the same wire for the top and/or bottom plane of multiple actuator subassemblies offers a significant manufacturing and cost benefit. To realize this it is important to prepare a layout where in each subassembly there are two adjacent frame corner connectors connected to a ground line and each of the opposite frame corner connectors is connected to a respective hardware switch toggling between the activation voltage and an isolated state. The toggling electrical switch can be preferably realized with a solid state semiconductor, a relay or an electromechanical switch. This will maintain no current flow into adjacent frames using the same continuous SMA wire, or also separate SMA wires attached to a common connector that being conductive makes them like a single wire.

It is also noted that the system frame is made such that the upper and lower part of each connector are isolated from each other, as shown in the sectional views of FIGS. 1B-1C, 2B, 3B-3D (for example, by making the frame as a dual layer PCB).

A preferred electronic schematic to supply power to the SMA elements for a system comprising twenty-four actuator subassemblies arranged in a 6×4 matrix is shown in FIGS. 4A and 4B. It is possible to observe that a common ground line is used for two adjacent rows of actuator subassemblies, simplifying the electrical schemes. The system works by using two separate switching ground lines, i.e. the ground potential must be switchable from ground1/ground2 to no potential (open), and ground1 and ground2 must be two separate ground levels which are isolated from each other (galvanically separated).

It is to be underlined that with the above solution it is not possible to operate each and every actuator subassembly in the system at the exact same time, but concurrent actuation (i.e. status change) can be achieved from an operational standpoint by applying a minimal operational delay with proper operation of the electrical switches, taking into account that such delay is in the order of milliseconds and does not affect the performance of the system.

More in detail, schematic 410 of FIG. 4A is for controlling the first (upper) SMA wires, the pins for controlling the SMA wires or the SMA wire portions of each subassembly being the top left one and the bottom right one, whereby pin 7 and pin 29 are missing in FIG. 4A since no wires would be attached to them. Similarly, schematic 420 of FIG. 4B is for controlling the second (lower) SMA wires, the pins for controlling the SMA wires or the SMA wire portions of each subassembly being the top right one and the bottom left one, whereby pin 1 and pin 35 are missing in FIG. 4B since no wires would be attached to them.

As already mentioned in relation to the constitutional details of the actuator subassemblies, one of the preferred uses is within analytical equipment. In this regard, the control method applied to the systems according to the present invention allows the selective control (opening and closing) of test wells in an analytical equipment, the number of test wells being usually 6, 12, 14, 48, 96 and 384 and is specified by the Society for Biomolecular Sciences as ANSI Standards according ANSI/SBS 1-2004, ANSI/SBS 2-2004, ANSI/SBS 3-2004, ANSI/SBS 4-2004.

The present invention is not limited to a specific SMA wire size, even though wires with a diameter comprised 30 μm and 200 μm are preferably used. Similarly, the invention is not restricted to specific materials for the SMA wires, even though Ni—Ti based alloys, such as Nitinol, are preferred.

Finally, with regard to the way to operate and control antagonistic wires, this information is known to a person of ordinary skill in the art, see for example the paper "An accurately controlled antagonistic shape memory alloy actuator with self-sensing" by Wang et al., published in 2012 in Sensors, 12, 7682-7700. It is important to underline that the term antagonistic wires indicates SMA wires whose actuations impart a movement to a displaceable element in opposite directions.

The invention claimed is:
1. An actuator subassembly comprising:
   a quadrangular frame, preferably square-shaped, with four corner connectors,
   a movable element placed in correspondence of the center of said quadrangular frame and connected thereto by elastically deformable arms,
   a first shape memory alloy wire fixed onto two of said corner connectors located at opposing positions, and
   a second shape memory alloy wire fixed onto the other two opposing corner connectors, such that two wire planes, each containing a shape memory alloy wire with its relevant corner connectors, intersect at an angle of 90°±20°,
   said first shape memory alloy wire contacting a first surface of said movable element and said second shape memory alloy wire contacting a second surface of the movable element, said second surface being opposed to said first surface such that the two shape memory alloy wires are arranged in an antagonistic configuration in which they exert a force in opposite directions on the movable element.
2. The actuator subassembly according to claim 1, wherein a plunger is connected to the second surface of the movable element and the second shape memory alloy wire passes between them.

3. The actuator subassembly according to claim 1, wherein the maximum distance between the first and second shape memory alloy wires is between 2.5 mm and 15 mm.

4. The actuator subassembly according to claim 1, wherein the distance between the corner connectors along the frame diagonal is between 25 and 100 mm.

5. A system comprising a plurality of actuator subassemblies according to claim 1 arranged in a matrix configuration with adjacent subassemblies sharing common corner connectors whose upper and lower parts are isolated from each other, each subassembly having two adjacent corner connectors connected to a ground line and each of the opposite corner connectors connected to a respective hardware switch toggling between the activation voltage and an isolated state, said toggling switch being preferably realized with a solid state semiconductor, a relay or an electromechanical switch.

6. The system according to claim 5, wherein a common ground line is used for two adjacent rows of actuator subassemblies, and when the system includes at least two separate common ground lines each of them is a separate ground level which is isolated from the other(s) and is switchable from a ground potential to no potential.

7. The system according to claim 6, wherein at least one of the first shape memory alloy wires contacts the upper surfaces of multiple diagonally aligned movable elements and at least one of the second shape memory alloy wires contacts the lower surfaces of multiple diagonally aligned movable elements, the number of movable elements contacted by a single shape memory alloy wire being preferably comprised between 6 and 96.

8. The system according to claim 6, wherein the plurality of first shape memory alloy wires are parallel to each other and the plurality of second shape memory alloy wires are parallel to each other.

9. A method of controlling a system according to claim 5, wherein actuation of a specific shape memory alloy wire is achieved by setting a voltage difference between the opposing corner connectors onto which said wire is fixed.

10. A method according to claim 9, wherein the method is adopted to control selective opening and closing of test wells in an analytical equipment, the number of said test wells being preferably comprised between 6 and 384.

11. The actuator subassembly according to claim 1, wherein the quadrangular frame is square-shaped.

12. The system according to claim 5, wherein the hardware switch toggling between the activation voltage and an isolated state is a solid state semiconductor, a relay or an electromechanical switch.

13. The system according to claim 6, wherein the number of movable elements contacted by a single shape memory alloy wire is between 6 and 96.

14. The method according to claim 9, wherein the number of said test wells is between 6 and 384.

* * * * *